United States Patent Office 3,839,522
Patented Oct. 1, 1974

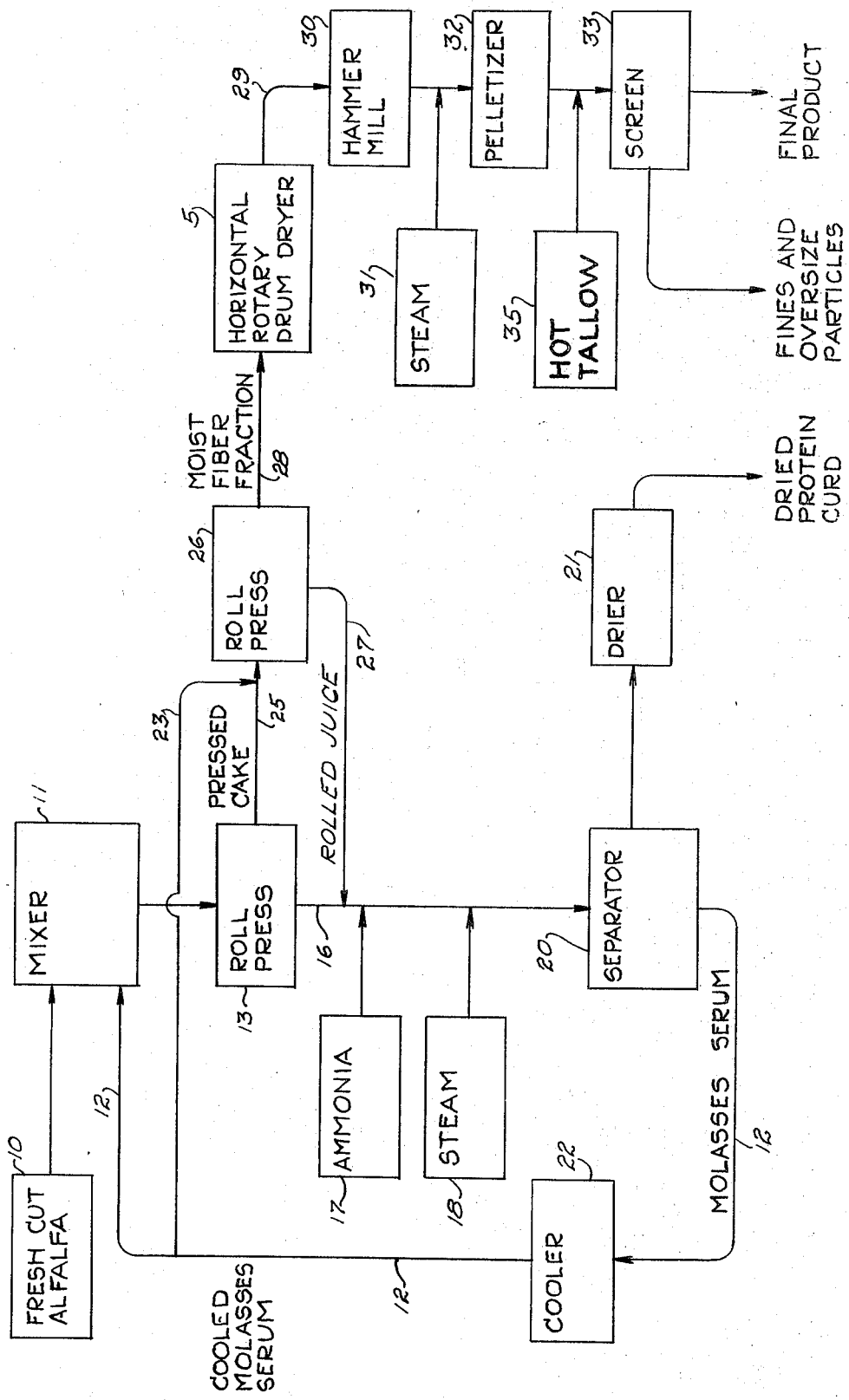

3,839,522
PROCESS FOR THE MANUFACTURE OF
DOG BEDDING
William R. Batley, Jr., Brawley, Calif., assignor to
Batley-Janss Enterprises, Brawley, Calif.
Continuation-in-part of application Ser. No. 167,901, Aug.
2, 1971, now Patent No. 3,775,133. This application
Feb. 16, 1972, Ser. No. 226,955
Int. Cl. D04h 3/16
U.S. Cl. 264—115                                    9 Claims

ABSTRACT OF THE DISCLOSURE

A process for manufacturing a particulated product useful as a bedding material for dogs and other household pets is disclosed herein. The bedding material has as its major ingredient the fiber fraction of alfalfa or other leafy green vegetable fibers. The alfalfa is pressed to remove a portion of its soluble solids and protein and dehydrated at a relatively low temperature. A minor amount of a waxey solid such as tallow is added and the fibrous fraction thus produced is pelleted and cut into lengths of about 1/4" to 3/8" long and 1/8" in diameter.

CROSS-REFERENCE TO RELATED APPLICATIONS

This is a continuation-in-part of application Ser. No. 167,901 filed Aug. 2, 1971 by the present applicant, now U.S. Pat. No. 3,775,133, issued Nov. 27, 1973.

BACKGROUND OF THE INVENTION

The field of the invention is animal bedding and more particularly relates to bedding useful for household pets such as dogs. A wide variety of materials have been used as dog bedding materials by pet owners, veterinarians and kennel operators. Cedar shavings, wood chips, blankets and the like and mattresses loosely stuffed with such materials are examples. Such products tend to harbor insects such as fleas and some of these materials can develop an unpleasant odor even after a relatively short period of use.

SUMMARY OF THE INVENTION

The present invention is for a process for the manufacturer of a dog bedding material resulting from the low temperature drying of highly squeezed alfalfa fibers to which a waxey solid such as tallow has been added. The material is preferably pelleted or otherwise particulated to produce a particle about 1/8" in diameter and 1/4" to 3/8" long. Fresh alfalfa is squeezed in the presence of a liquid which is a solvent for a portion of the non-fibrous fraction of the alfalfa. There may be a plurality of such squeezing steps. The pressed cake resulting from the squeezing step or steps is then fed to a drier such as a horizontal rotary drum drier which is operated at a temperature below about 1400° F. and preferably at about 1000° F. The dried fibrous fraction is next particulated by means such as by passing it through a hammer mill and pelletizer. Lastly, while still warm, it is sprayed with a waxey liquid which is solid at room temperatures, such as tallow. The particulating step should be carried out to provide a particle having a density greater than about 40 lbs./cu. ft. which results in particles which more readily fall from the pet before he leaves the bedding area.

BRIEF DESCRIPTION OF THE DRAWING

The drawing shows a flow sheet of a process useful for the preparation of the product of the present invention.

DESCRIPTION OF THE PREFERRED EMBODIMENTS

The present process will be described as applied to alfalfa but other green crops such as grasses, clover and the like may also be used as a starting material. As shown in the drawing, freshly cut alfalfa 10 is fed to a mixer 11 where it is mixed with a stream 12 of cooled ammoniated molasses serum. The source of this serum will be described below. Other liquids which serve as a solvent for the non-fibrous portion of fresh alfalfa may be used in place of the ammoniated molasses serum. Examples of other liquids include water, ammoniated water and non-ammoniated molasses serum.

The mixture or slurry is next fed to a first roll press 13 which may be a conventional sugar cane press. Other types of presses may also be used, such as auger presses, expeller presses, and the like. This pressing step results in a liquid stream 16 and a pressed cake 25. The pressed cake may be mixed with additional ammoniated molasses serum and fed to a second roll press 26 in order to arrive at the desired moisture content of below about 70% moisture. The liquid added to the once pressed cake need not be the same liquid as that added to the freshly cut alfalfa. For instance, ammoniated molasses serum may be added to the freshly cut alfalfa prior to the first pressing step and water or ammoniated water could be added to the once pressed cake. A second liquid stream 27 exits the second roll press 26 and is added to stream 16. The second roll press 26 may also be a sugar cane roll press which conventionally uses three rolls driven by an electric motor through a reduction gear. It is advantageous to adjust the roll nip or separation of both presses wide enough to permit the passage of fiber through the nip and yet narrow enough so that the resulting pressed cake from the second roll press (or the first roll press if only one is used) is below about 70%. The use of two, three or more squeezing steps results in a greater removal of soluble materials from the fibrous fraction and thus in a more absorbent and better bedding material.

The moist fiber fraction 28 is fed to a horizontal rotary drum drier 5. Drier 5 is of conventional design used for alfalfa dehydration and is gas-fired. Air is mixed at the throat of the drier with the 1600° F. combustion gases in order to control the temperature. The air temperature of drier 5 should be held below about 1400° F. and preferably about 1000° F. It has been discovered that the odor of the finished product can be substantially reduced by the use of this relatively low temperature drying step. It is believed that this reduction is caused by the reduced amount of burned or charred fibers and lower level of scorched protein and sugars which remain in the fibers. The product of the present invention has an odor more like sun-dried alfalfa hay than does ordinary dehydrated alfalfa.

The dried fiber fraction 29 exhibiting drier 5 is fed through a hammer mill 30 which may be a conventional hammer mill used in dehydrated alfalfa processing in order to disintegrate, compact or pulverize the fiber fraction. The product leaving mill 30 is mixed with steam 31 and is passed through a pelletizer 32. The pelletizer is operated to produce a pellet having a diameter of about 1/8" and a length of from about 1/4" to about 3/8".

The warm, pelleted material leaving pelletizer 32 is then sprayed with 1/2 to 10% by weight of a molten material which becomes a waxey solid at room temperature. A preferred waxey material is tallow 35. It is preferable that the tallow be protected by the addition of an anti-oxydent such as 6 - ethoxy - 1,2 - dihydro-2,2,4-trimethylquinoline which is effective at a level of about 0.015% by weight of final product. The pelleted, coated material is next passed to a screen 33 where oversized particles and fines are removed. The final product is now ready for packaging.

The rolled juice streams 16 and 27 leaving roll presses 13 and 26 are ammoniated by feeding a stream of ammonia 17 directly into the liquid line. The pH of the ammoniated juice should be between about 8 and 9 and preferably about 8½. The juice is next heated by the injection of steam 18 to increase its temperature to about 180° F. The pH and temperature adjustment causes a precipitation or separation of protein curd from the remaining molasses serum. The curd may be separated by gravity and dried and has found wide acceptance as a high protein feed additive. Further details of this separation may be found in parent application Ser. No. 167,901 filed Aug. 2, 1971, now U.S. Pat. No. 3,775,133, issued Nov. 27, 1973.

The molasses serum which still contains some ammonia is next cooled in cooler 22 which may be an evaporative cooler. It is preferable that the serum be cooled to below about 100° F. so that no protein will be coagulated in the mixer 11 or in the roll presses 13 and 26. Any molasses serum not required to sufficiently wet the alfalfa may be passed to storage for use in conjunction with a conventional alfalfa dehydrating process to produce an animal feed additive. It is highly advantageous that the pressing step be carried out in the presence of an excess of liquid such as molasses serum as this has been found to greatly increase protein and soluble solid removal.

While ordinary dehydrated alfalfa has a protein content of 17% or more, the fiber fraction used in conjunction with the present invention ordinarily has a protein content below 17% and may have a protein content as low as 14%. The density of the product of the present invention may be comparable to the density of ordinary dehydrated alfalfa, that is, from 42 to 46 lbs./cu. ft.

Dogs have been observed to prefer the dog bedding disclosed herein as compared with conventional bedding materials such as cedar shavings and this preference is believed to result from a number of factors. First, the odor of the low temperature dried alfalfa is pleasant to most dogs. Secondly, the tallow adds a pleasant odor and also reduces dusting. The tallow has yet another function or benefit in that it shines the dog's coat and thus tallow is a preferred waxey solid for use with the present invention. The dog bedding of the present invention is insulative to dogs and they appear to like to partially bury themselves in the bedding material.

The fiber fraction of alfalfa, and in fact, ordinary dehydrated alfalfa itself, does not attract bugs, rodents and other pests. The natural chlorophyll is a natural deodorant and thus helps to retain the clean, fresh odor of the bedding material for long periods of time. Furthermore, when it is time to change the bedding, the alfalfa fiber is an excellent source of humus for the lawn or garden.

The level of waxey solid added may vary depending on the nature of the waxey material chosen. For tallow, it has been found that a level of from about 1% to 3% by weight is sufficient to prevent dusting and impart a pleasant odor. It is believed that this level of tallow also helps to repel fleas. The dog bedding thus made is a purely organic product containing no potentially harmful additives.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A process for preparing a dog bedding comprising:
   (a) mixing fresh alfalfa having a fibrous fraction and a non-fibrous fraction with a liquid capable of dissolving at least a portion of said non-fibrous fraction to produce a fresh alfalfa slurry;
   (b) subjecting said slurry to pressing means to remove a portion of said liquid and a portion of said non-fibrous fraction contained in said fresh alfalfa and to yield a pressed cake containing the fibrous fraction of said fresh alfalfa;
   (c) subjecting said pressed cake to a drying step to yield a dried fiber fraction;
   (d) passing said dried fiber fraction to fragmenting means to produce a fragmented, particulate alfalfa fibrous fraction;
   (e) passing said fragmented, particulate alfalfa fibrous fraction to compacting means to produce a compacted, particulate alfalfa fibrous fraction; and
   (f) adding to said compacted, particulate alfalfa fibrous fraction about ½% to about 10% by weight of a waxy substance to produce said dog bedding.

2. The process of claim 1 wherein said liquid is selected from the group consisting of water, ammoniated water, molasses serum and ammoniated molasses serum.

3. The process of claim 1 wherein said liquid is ammoniated molasses serum.

4. The process of claim 1 wherein said step (b) comprises passing said slurry through a three-roll sugar mill.

5. The process of claim 1 with the additional steps of, after said step (b) and before said step (c):
   mixing said pressed cake a second time with a liquid capable of dissolving at least a portion of the non-fibrous fraction of said fresh alfalfa to yield a pressed cake slurry; and
   passing said pressed cake slurry to pressing means to remove at least a portion of said liquid and further solute dissolved therein and to yield a twice pressed cake.

6. The process of claim 5 with the additional step of subjecting the twice pressed cake to at least one additional mixing and pressing step.

7. The process of claim 1 wherein said drying step (c) is carried out with air as the drying medium at a temperature of below about 1400° F.

8. The process of claim 1 wherein said fragmenting step (d) and said compacting step (e) comprises the steps of:
   passing said dried fiber fraction to a hammer mill whereby said dried fiber fraction is pulverized and disintegrated;
   adding steam to said pulverized and disintegrated fiber fraction to yield a moist, pulverized fiber fraction; and
   passing said moist, pulverized fiber fraction through a pelletizer to produce a pelletized, particulate alfalfa fibrous fraction.

9. The process of claim 8 wherein said pelletizer is operated to yield pellets having a diameter of about ⅛" and a length of from about ¼" to about ⅜".

References Cited
UNITED STATES PATENTS

| | | | |
|---|---|---|---|
| 2,552,343 | 5/1951 | Peebles et al. | 99—8 |
| 3,684,520 | 8/1972 | Bickoff et al. | 99—8 |

ROBERT F. WHITE, Primary Examiner

J. R. HALL, Assistant Examiner

U.S. Cl. X.R.

264—118, 128